United States Patent [19]

Baudin

[11] Patent Number: 4,842,664
[45] Date of Patent: Jun. 27, 1989

[54] PROCESS OF BENDING THERMOPLASTICS SHEETS AND MANUFACTURING LAMINATED LIGHT TRANSMITTING PANELS

[75] Inventor: Pol Baudin, l'Evêque, Belgium

[73] Assignee: Glaverbel, Brussels, Belgium

[21] Appl. No.: 83,275

[22] Filed: Aug. 10, 1987

[30] Foreign Application Priority Data

Aug. 9, 1986 [GB] United Kingdom ............... 8619464

[51] Int. Cl.$^4$ .................. B32B 31/12; B32B 17/10
[52] U.S. Cl. .................. 156/102; 156/242; 156/278; 264/241; 264/320; 428/412
[58] Field of Search ............. 156/99, 102, 242, 278; 428/412; 264/241, 320

[56] References Cited

U.S. PATENT DOCUMENTS

| | | | |
|---|---|---|---|
| 3,808,077 | 4/1974 | Rieser et al. | 156/99 X |
| 4,328,277 | 5/1982 | Molari | 428/412 X |
| 4,445,953 | 5/1984 | Hawk | 156/102 |

Primary Examiner—Robert A. Dawson
Attorney, Agent, or Firm—Spencer & Frank

[57] ABSTRACT

A process of imparting a predetermined curvature to a sheet of thermoplastics material in which a thermoplastics sheet is bent by placing it against a face of a bending form. The form having a moulding surface area of the required curvature. The process includes heating the thermoplastics sheet and causing or allowing it to conform to the moulding surface area. The thermoplastics sheet is formed oversized and is bent by placing it against a bending form having a moulding surface area portion of the required dimensions and curvature which is surrounded by a bending form surround. Next, the thermoplastics sheet is heated and caused or allowed to conform to the moulding surface area portion while its oversized margins are supported by the bending form surround. Thereafter, the thermoplastics sheet is cooled at a rate slow enough to maintain such conformity, and then the thermoplastics sheet is trimmed to size.

21 Claims, 3 Drawing Sheets

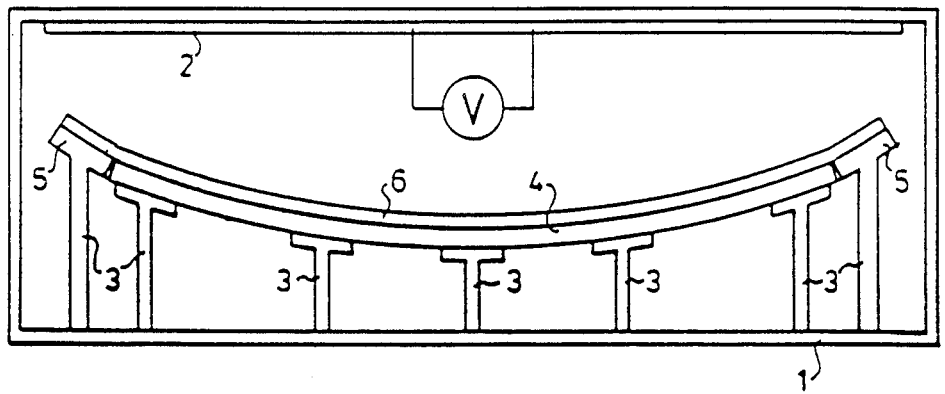
FIG.1
FIG.2
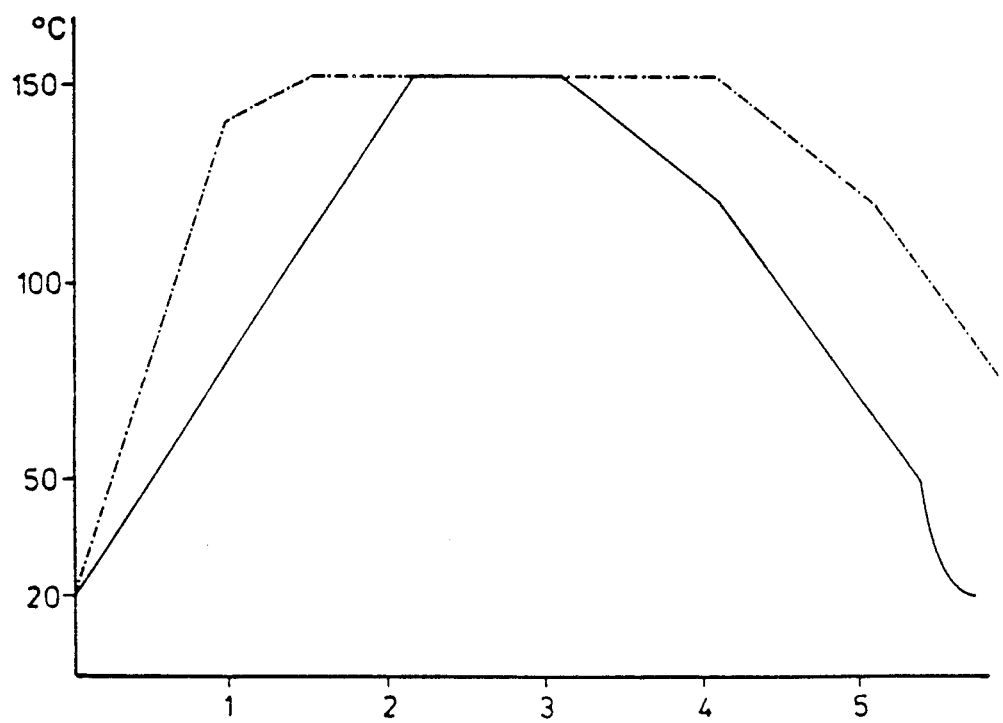

PROCESS OF BENDING THERMOPLASTICS SHEETS AND MANUFACTURING LAMINATED LIGHT TRANSMITTING PANELS

BACKGROUND OF THE INVENTION

This invention relates to a process of imparting a predetermined curvature to a sheet of thermoplastics material in which a said thermoplastics sheet is bent by placing it against a face of a bending form having a moulding surface area of the required curvature, heating said thermoplastics sheet and causing or allowing it to conform to said moulding surface area. The invention also relates to apparatus for imparting a predetermined curvature to a sheet of thermoplastics material.

Glass-plastics laminated panels are often used when the panel is apt to be subjected to impact. Thermoplastics sheets in the interior of such a panel can serve to absorb energy on impact against the panel, so giving greater protection to an enclosure incorporating such a panel as a window. If a thermoplastics sheet forms an external ply of the panel, it will serve to inhibit glass fragments flying from that face of the panel on breakage, so reducing the risk of injury from flying glass. Curved panels of that kind may be used as windscreens or other windows of vehicles of various types, including aircraft and motor cars.

It is of course well known to use a thin flexible film of thermoplastics adhesive material, such as polyvinylbutyral, for forming a laminate, but there is an increasing tendency to make use of rather more rigid thermoplastics materials since these have improved properties for impact resistance. Such panels are sometimes referred to as being "bandit glazings" or "bullet-proof glazings", and they can afford a degree of protection against the discharge of firearms.

Polycarbonates and methacrylates are examples of rather rigid thermoplastics materials. Because these materials are very much stiffer than materials which are conventionally laminated to glass, such as polyvinylbutyral, a considerable problem arises in that if the thermoplastics material does not conform to the curved glass sheet to which it is to be bonded, restoring forces in the thermoplastics material of a laminate tend to tear it away from the glass and delamination results. The problem is found to be particularly acute where the laminate has a small radius of curvature, and also around the edges of the laminate, where stresses are concentrated. It is doubly unfortunate in this respect that vehicle windscreens often seem to have their sharpest curvature at or near their edges.

It is accordingly desirable to bend the thermoplastics sheet material into the desired predetermined curvature before lamination. The thermoplastics material may be heated and allowed to sag into conformity with a bending form of appropriate size and shape. But this does not solve the problem of delamination, especially around the margin of the panel, because we have found that as the sheet of thermoplastics material cools after bending, it tends to curl up around its margin, so that it will not there conform to the required curvature. Such lack of conformity also increases the difficulties in forming a good bond between the sheets in a laminating process. Such curling may be pressed out naturally during the laminating process, but residual stresses remain in the thermoplastics material tending to cause delamination around the laminate margins. Even if the thermoplastics sheet is to be used on its own, without lamination, such edge curling is undesirable because it results in optical distortion at the sheet margins, and it makes framing more difficult.

It is a principal object of this invention to provide a process of imparting a predetermined curvature to a sheet of thermoplastics material which alleviates, and in preferred embodiments, eliminates this problem.

SUMMARY OF THE INVENTION

According to this invention, there is provided a process of imparting a predetermined curvature to a sheet of thermoplastics material in which a said thermoplastics sheet is bent by placing it against a face of a bending form having a moulding surface area of the required curvature, heating said thermoplastics sheet and causing or allowing it to conform to said moulding surface area, characterised in that a said thermoplastics sheet is formed oversized and is bent by placing it against a bending form having a moulding surface area portion of the required dimensions and curvature which is surrounded by a bending form surround, said thermoplastics sheet is heated and caused or allowed to conform to said moulding surface area portion while its oversized margins are supported by said bending form surround, and the thermoplastics sheet is thereafter cooled at a rate slow enough to maintain such conformity, and in that the thermoplastics sheet is thereafter trimmed to size.

By working in this way, the tendency of the thermoplastics material to curl up around the margin of its required size is reduced, and it is very much easier to achieve the required curvature over the full extent of the sheet which is to be incorporated as or in a glazing panel. Such curling can be confined to a relatively narrow marginal strip which is trimmed off, and may even be entirely eliminated. Accordingly, a very high degree of conformity of the thermoplastics sheet to the required predetermined curvature is promoted, so ensuring that the thermoplastics sheet is of the required shape to facilitate subsequent framing or lamination, and leading to a greatly reduced tendency for delamination to occur.

There is another problem which may appear when bending thermoplastics sheets. We have found that a certain surface waviness may become apparent in the thermoplastics material after cooling, unless the thermoplastics material is allowed to cool at a very slow rate. This involves a lengthy production schedule which is quite inconsistent with manufacture on an industrial scale. Such a wavy profile also increases the difficulties in forming a good bond between the sheets in a subsequent laminating process. Such waves may be pressed out naturally during the laminating process, but residual stresses remain in the thermoplastics material tending to cause delamination, especially around the laminate margins. Even if the thermoplastics sheet is to be used on its own, without lamination, such waviness is undesirable because it results in optical distortion.

Factors which appear to make this problem more acute are the rather low thermal conductivity and the rather high coefficient of linear thermal expansion of the thermoplastics materials particularly in view.

The problem of achieving or maintaining a high surface regularity in the thermoplastics material while reducing the cooling time required should therefore be soluble by controlling the cooling rate so that any irregularity in shrinkage of the thermoplastics sheet as it cools after bending can be compensated for by plastic flow within the material. In other words, more rapid cooling can be tolerated while the thermoplastics material is hotter and softer, but as the material cools and becomes more viscous, the cooling rate should be reduced.

Certain especially preferred embodiments of this invention are based upon our discovery that this is simply not true. Indeed we have found that the converse is the case. Accordingly, in the most preferred embodiments of the invention the thermoplastics material, while it remains in contact with said bending form moulding surface, is caused or allowed to cool from its maximum temperature for a first period at a first cooling rate and thereafter for a second period at a second cooling rate which is higher than said first cooling rate.

Much to our surprise, we have found that the rate of cooling is most critical while the thermoplastics material is close to the maximum temperature to which it is heated for the bending process, and that it is at such temperatures that the rate of cooling should be most carefully controlled, while greater cooling rates can be tolertaed at lower temperatures in order to give an acceptably short total cooling time and to result in a thermoplastics sheet of acceptable surface regularity. As we have mentioned, this is the converse of what is to be expected, and we can at present offer no explanation why it should be so.

The advantages of conforming a thermoplastics sheet accurately to a predetermined curvature are particularly manifest in cases where that sheet is subsequently to be bonded into a laminate with one or more other sheets having that same curvature, and accordingly, in a second aspect, the invention provides a process of manufacturing a curved light transmitting laminated panel comprising at least one sheet of curved thermoplastics material bonded to at least one curved sheet of glass which process comprises bending said sheets to a predetermined curvature and subsequently bonding them together, characterised in that a said thermoplastics sheet is curved by a process as hereinbefore defined, and in that the thermoplastics sheet and at least one and in that the thermoplastics sheet and at least one conforming glass sheet are assembled and the assembly is subjected to heat and pressure conditions to effect bonding of the sheets into a laminated panel.

Advantageously, the or each said thermoplastics sheet is trimmed to size after bonding into said panel. This facilitates accurate cutting of the thermoplastics sheet material to the correct size and shape.

Such a thermoplastics sheet may be bonded between two conforming glass sheets. In that case any residual stresses in the thermoplastics material will be distributed over both its bonded faces. The stress concentration at any point in the glass/thermoplastics joint will therefore be approximately half what would be the case if the thermoplastics material was only bonded on one side to a glass sheet. The invention is therefore of particular benefit in processes of manufacturing a said laminated panel of the type in which thermoplastics material is exposed over at least one main face of the panel.

Preferably, such sheet glass and sheet thermoplastics material are interleaved with adhesive thermoplastics film material and are assembled together with a curved glass moulding plate in contact with the or each exposed face of thermoplastics material, and the assembly thus formed is subjected to heat and pressure conditions such as to bond together the sheet glass and sheet thermoplastics material. The use of such a moulding plate promotes a high degree of surface regularity in the contacting thermoplastics material.

In such embodiments, it is preferred that the or each said curved glass moulding plate and the or each curved glass sheet to be bonded into the laminate are assembled together and bent as one into the required curvature. This is a very convenient way of ensuring that both or all of those glass sheets are bent to the same curvature.

The thermoplastics material to be used may have been made into sheet form by extrusion. In general, such extruded sheets have a rather poor surface quality and they are insufficiently planar to allow good through visibility for various purposes. Any irregularity in the thickness of the thermoplastics material can render such a laminate commercially unsatisfactory or even dangerous where good visibility is important, as it is with vehicle windscreens. Accordingly it is known to rectify any surface irregularities in thermoplastics sheets by subjecting the sheets to a surface conditioning treatment.

We have found that although many surface irregularities could be rectified by heating a thermoplastics sheet to soften it while it was subjected to pressure between a pair of moulding plates, a certain surface waviness also became apparent in the thermoplastics material after cooling and pressure relaxation at the end of the surface conditioning treatment, again unless the thermoplastics material was allowed to cool at a very slow rate, even though the thermoplastics material does not bond to either moulding plate with which it is in contact.

Again, this problem becomes more acute, the greater is the disparity between the coefficients of linear thermal expansion of the moulding plate and plastics materials, and so it must also be attributed to that disparity.

In order to alleviate this problem, it is especially preferred that the surfaces of a said thermoplastics sheet are conditioned by a process comprising sandwiching the thermoplastics sheet between a pair of glass moulding plates and subjecting the sandwich to temperature and pressure conditions such as to soften the thermoplastics material and bring about the required surface conditioning, in which process, prior to removal of said moulding plates, the thermoplastics material is caused or allowed to cool from its maximum temperature for a first period at a first cooling rate and thereafter for a second period at a second cooling rate which is higher than said first cooling rate.

This also permits a reduction in the time required for cooling, and at the same time it allows a high degree of regularity in the surface conditioned thermoplastics sheet.

We specify the use of glass moulding plates because this is particularly advantageous in view of the ease with which such a moulding plate can be formed with a highly regular surface, even though the difference between the coefficients of thermal expansion of glass and many of the thermoplastics materials in view can be quite large.

It is especially preferred that a sheet of float glass defines the moulding surface of the or each said glass moulding plate. Because of the way in which it is made, float glass has a very high degree of surface regularity without requiring any subsequent surfacing treatment. The use of float glass having a nominal thickness of between 4 mm and 8 mm, e.g. 6 mm, is especially recommended because float glass of that thickness is ordinarily found to have the best surface quality.

In embodiments which make use of this preferred feature of the invention, it is preferred that a plurality of said thermoplastics sheets is interleaved with glass moulding plates to form a multi-layer sandwich whereby said plurality of thermoplastics sheets is conditioned simultaneously. This represents a more efficient use of plant and accordingly gives a more economical process.

Advantageously, such surface conditioning treatment is performed before the thermoplastics material is curved. This avoids the necessity of making a plurality of curved moulding plates each of which conforms to the said predetermined curvature. The thermoplastics material may be surface conditioned in the flat, and this greatly simplifies the procedure.

We have found that the extent to which waviness or uneven stresses in a thermoplastics sheet are reduced by controlled cooling is dependent on the rate of cooling in said first and second cooling periods, and also on the temperature at which uncontrolled cooling is allowed to commence. Accordingly the adoption of one or more of the following preferred features of the invention is recommended:

the or at least one, and preferably each said first cooling period lasts until the temperature of the thermoplastics material has dropped by between 20° C. and 60° C.;

the or at least one, and preferably each said first cooling period lasts between 40 and 90 minutes;

the or at least one, and preferably each consecutive first and second cooling periods together last between 90 and 150 minutes;

the or at least one, and preferably each said second cooling period lasts at least until the temperature of the thermoplastics material has dropped to 100° C.; and the or at least one, and preferably each said second cooling period lasts at least until the temperature of the thermoplastics material has dropped to 80° C.

For similar reasons it is also advantageous to adopt one or both of the two following preferred features:

during the or at least one, and preferably each said first cooling period, the thermoplastics material is caused or allowed to cool at a rate which does not exceed 2° C. per minute, and which preferably does not exceed 1° C. per minute; and during the or at least one, and preferably each said second cooling period, the thermoplastics material is caused or allowed to cool at a rate which does not exceed 5° C. per minute, and which preferably does not exceed 2.5° C. per minute.

Such cooling rates are found to be quite compatible with common industrial production schedules.

It will be apparent that the thermoplastics material should not be caused to adhere to a said moulding plate either by a said surface conditioning treatment, or by a said laminating treatment. Subsequent removal of the moulding plate, if indeed it were practically possible, would almost inevitably mar the surface of the thermoplastics material if such bonding were to occur. Some thermoplastics sheet materials will not normally adhere to glass during the course of the treatments envisaged without the use of a primer or some sort of adhesive. Other materials may adhere unless steps are taken to prevent adhesion. In order reliably to inhibit adhesion it may therefore be preferable for the or each said glass moulding plate to bear an adhesion inhibiting layer for example of a fluorocarbon product such as a fluoroalkyl-sulphonate, especially one in which the alkyl is C14 to C18.

As we have stated, several of the problems which certain embodiments of the present invention are concerned to alleviate are more acute the greater is the coefficient of linear thermal expansion of the thermoplastics material. Accordingly, embodiments of the invention in which the material of the or at least one said thermoplastics sheet has a coefficient of linear thermal expansion which is at least $43 \times 10^{-6} °C.^{-1}$, that is, about 5 times that of ordinary soda-lime glass, are of special commercial value.

The commercial value of those preferred embodiments of the invention in which the thermoplastics sheet material has a rather high coefficient of linear thermal expansion does not always depend solely upon the alleviation of a more acute problem due to greater thermal contraction. Other properties of the thermoplastics material must also be taken into consideration.

In some preferred embodiments of the invention, the or at least one said thermoplastics sheet is a sheet of polycarbonate. Polycarbonates have, apart from their coefficients of thermal expansion, particularly desirable physical properties for incorporation into laminates for use for many purposes, in particular as regards their ability to dissipate energy on breakage, or attempted breakage of a laminate. Methacrylates also have good properties for the purpose in view, as do some polyvinylchlorides and some polyurethanes.

Other properties of the thermoplastics sheet material are also important. For example a high scratch resistance is of considerable commercial importance during handling of a thermoplastics sheet, for example prior to its incorporation into a laminate, and especially over an exposed thermoplastics surface of a finished laminate.

While it may sometimes be possible to select the thermoplastics sheet material for good scratch resistance, attributable to its hardness, it is usually more convenient to augment the surface hardness of the sheet by an appropriate coating treatment, for example using a synthetic resin which may, for one reason or another, be unsuitable for forming the full thickness of the sheet. In preferred embodiments of either aspect of the invention, therefore, the or at least one said thermoplastics sheet bears at least one surface coating which is, or is curable to become, harder than the thermoplastics material of that sheet.

In such preferred embodiments, it is particularly convenient for curing of said surface coating(s) to be effected during said surface conditioning. Such curing may alternatively be effected during bending. This avoids the necessity of a separate curing treatment, and is thus economical of time and, in the case of heat curing, of heating energy.

A said surface coating which is a melamine coating is advantageous because of its excellent properties for the purposes in view. Other coating materials which may be used with advantage are polysiloxane resins and electron-beam or ultra-violet curable resins, for example those specified in British Patent Specification No. GB 2 131 324 A.

Advantageously, said bending form and said bending form surround are constituted by separable elements. This is found to simplify removal of the conforming sheet of thermoplastics material from the bending form, and it also permits the separable portions of the bending form to be made of different materials.

The actual materials from which the bending form portions are made is not critical. The shape of said bending form moulding surface area of the required size and curvature is, however, very important. Preferably, said bending form moulding surface area of the required size and curvature is constituted by a face of a curved sheet of glass. It is much easier to make a bending form moulding portion of the required curvature with a high quality surface out of glass than out of other materials. It is suitable to make that portion which defines the marginal bending form surround face area from for example, polytetrafluoroethylene or wood.

The shape of the bending form moulding surface is of the utmost importance in embodiments in which the thermoplastics sheet material is subsequently to be bonded to a curved glass sheet. If the thermoplastics is to conform accurately to the glass to which it is to be bonded, clearly that bending form portion must also conform accurately. The simplest way of ensuring this is to constitute said bending form moulding surface area of the required size and curvature by a face of a curved sheet of glass to which the thermoplastics sheet is subsequently bonded, and embodiments of the invention having this feature are accordingly preferred. The adoption of this preferred feature implies that the bending form moulding surface shall be changed for each thermoplastics sheet. This is no disadvantage even when manufacturing a series of, for example, windscreens which are to be fitted to motor vehicles of the same model, and which must therefore be of nominally the same size and curvature. In fact in the production of a given run of curved panels for use as vehicle windscreens, we have found that a certain small variation in curvature from one panel to the next can be tolerated. However, we have found that the requirements for accurate conformation between a thermoplastics sheet and a glass sheet to which it is to be bonded may often be more stringent, and this accordingly justifies the use as bending form of the curved glass sheet to which the thermoplastics sheet is to be bonded. Of course during the bending of a series of thermoplastics sheets to the same nominal curvature in such a production run, it is not generally necessary to change the bending form surround.

Preferably, said thermoplastics sheet is caused or allowed to conform to a concave bending form face. It is found that this simplifies the achievement of the required surface conformity.

It is particularly important to achieve good conformity at the margins of the thermoplastics sheet after trimming. In order to promote this end, it is preferred that the transition from said bending form moulding surface area of the required size and curvature to such bending form surround is of sharper curvature than the margin of said bending form moulding surface area. Surprisingly, we have found that this gives the best results, even when the thermoplastics material is caused or allowed to conform to a concave bending form face.

The present invention includes a sheet of light transmitting thermoplastics material which has been curved by a process as herein defined, it includes a laminated, light transmitting panel comprising at least one curved sheet of glass bonded to at least one such curved sheet of thermoplastics material, and it also includes a laminated, light transmitting panel which has been manufactured by a process as herein defined.

The present invention extends to apparatus suitable for conforming thermoplastics sheet material to a curved glass sheet, and there is accordingly provided apparatus for imparting a predetermined curvature to a sheet of thermoplastics material, characterised in that such apparatus includes a bending form having a moulding surface area of the required dimesions and curvature and a bending form surround, means for heating and softening a thermoplastics sheet so that it can conform to said bending form moulding surface, while any overlapping margins of the sheet are in part supported by said bending form surround, and means for allowing controlled cooling of the thermoplastics sheet to maintain conformity with said bending form moulding surface.

This is a very simple apparatus for conforming thermoplastics sheet material to a curved glass sheet. The said bending form surround can be used to support a marginal portion of a thermoplastics sheet so as to accommodate expansion and contraction of a said thermoplastics sheet on heating and cooling, and together with the means permitting controlled cooling, it enables the thermoplastics sheet to cool more uniformly over its area so giving a reduced tendency for any distortion of the sheet due uneven contraction.

Advantageously, the moulding surface area of said bending form is defined by a face of a curved sheet of glass. It is very easy to form a curved glass bending form with a very smooth and high quality surface. Preferably, said glass sheet is a sheet of float glass. Glass formed by the float process has a particularly good surface quality without the need for any special surfacing treatments.

Preferably, said bending form has a concave moulding surface. It is found easier to conform a thermoplastics sheet to a concave face of a given curvature than to a convex face of that curvature.

In preferred embodiments of the invention, the transition from the moulding surface of said bending form to said bending form surround is of sharper curvature than the margin of the surface of said first bending form portion. This is found to be of particular value when the curvature which it is desired to impart to the thermoplastics material is of relatively small radius of curvature, especially near the edges of the bending form moulding surface, and where it is desired to impart a non-developable curvature to the thermoplastics sheet material.

BRIEF DESCRIPTION OF THE DRAWINGS

The invention will now be described in greater detail by way of Examples and with reference to the accompanying diagrammatic drawings in which:

FIG. 1 is a view of an embodiment of apparatus according to this invention;

FIG. 2 is a graph setting out temperature schedules for two specific processes for conforming a thermoplastics sheet to a curved glass sheet in accordance with this invention;

DETAILED DESCRIPTION OF THE EMBODIMENTS

Figure 3:
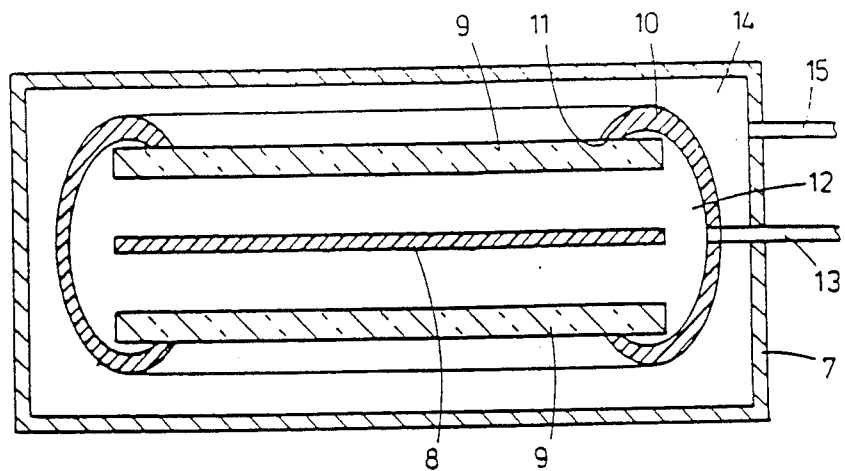
FIG. 3 is a schematic cross sectional view of an apparatus for surface conditioning a sheet of thermoplastics material prior to conforming it to a glass sheet.

In FIG. 1, an autoclave 1 has a roof heater 2 connected to a variable power supply V. Contained within the autoclave 1 is a bending apparatus which is made in two parts and is carried by a plurality of supports 3. The first bending form part consists of a sheet, preferably of glass, and optimally of float glass, which defines a moulding surface 4 of the required size and curvature. A bending form surround 5 leads around the margin of the glass plate defining the moulding surface 4. A sheet of thermoplastics material 6 is shown conforming to the bending form moulding surface 4 and the surface of the bending form surround 5. The boundary of the bending form moulding surface 4 is substantially contiguous with the inner periphery of the bending form surround 5 at the working surface of the bending form, and that surround 5 is so arranged that the transition from the bending form moulding surface 4 to the surround 5 is of lesser radius of curvature than that of the sheet 4 at its margin.

EXAMPLE 1

It is desired to conform a sheet of polycarbonate to the concave face of a sheet of glass having a required predetermined curvature. That glass sheet is placed in the apparatus shown in FIG. 1 to constitute the bending form moulding surface 4, and a flat, oversized sheet of the polycarbonate is rested over the bending form moulding surface 4, and its surround 5. The heater 2 is then switched on, care being taken to ensure that the glass sheet defining the moulding surface 4 and the polycarbonate sheet 6 are heated as evenly as possible, and the polycarbonate is heated to a temperature of about 155° C. during the course of about two hours and a quarter as indicated by the solid line in FIG. 2. That temperature is maintained for about one hour, at the end of which time the polycarbonate has sagged into conformity with the glass sheet moulding surface 4, whereupon the power supplied to the heater 2 from the variable supply V is reduced so that the polycarbonate material cools from its maximum temperature for a first cooling period of about an hour and a quarter at a rate of 0.5° C. per minute. The power supply is then further reduced and the polycarbonate is allowed to cool at a rate of 1° C. per minute during a second cooling period which lasts for a further hour to an hour and a quarter. When the polycarbonate has reached a temperature of 50° C., the autoclave is opened and the polycarbonate is allowed to cool naturally. The oversized margins of the polycarbonate are then trimmed off, and is found that the polycarbonate sheet has a very high degree is found that the polycarbonate sheet has a very high degree of conformity with the glass sheet 4, even at its margin.

In a variant of this Example, it is desired to conform the polycarbonate to a convex face of a curved sheet of glass. In order to do this, that curved sheet of glass is bent by a technique known per se while in face to face contact with a second sheet of glass, so that the concave face of that second sheet conforms with the convex face of the first. In this case, it is the second sheet of glass which is placed into the apparatus of FIG. 1 as the bending form sheet portion. The remainder of the process is as set out above.

In a second variant of this Example, the polycarbonate is subjected to a more rapid heating and remains at its maximum temperature for longer. This variant procedure is particularly appropriate for achieving a non-developable curvature and/or where small radii of curvature are involved, and it is represented by the dot-dash line in FIG. 2. The temperature of the polycarbonate is raised to 140° C. in about an hour and then to 155° C. in a further half hour. It remains at that temperature for about two hours and a half, and is then subject to the cooling schedule set out above.

FIG. 3

FIG. 3 shows an autoclave 7 in which is located a sandwich assembly comprising a sheet 8 of thermoplastics material, for example of polycarbonate, positioned between two flat glass moulding plates 9 suitably formed of 6 mm float glass. Each glass moulding plate 9 is coated on both its faces with an optional adhesion inhibiting coating of, for example, a potassium fluoro-alkyl-sulphonate such as FC129 from 3M.

Such an adhesion inhibiting coating may be formed by spraying or dipping.

It will be appreciated that a plurality of thermoplastics sheets such as indicated at 8 may be interleaved with glass moulding plates 9 bearing such an adhesion inhibiting coating on each face thereof to form a multi-layer sandwich for the simultaneous conditioning of those sheets.

A torus 10 of elastomeric material is slit to define lips 11 which are placed in contact with the margins of the (outer) moulding plates 9 so as to define a space 12 leading around the edges of the sandwich assembly. This space 12 is in communication with a vacuum pump (not shown) via a conduit 13. The interior space 14 of the autoclave 7 is connected to another pump (also not shown) via a second conduit 15. The autoclave is provided with heating means which are not shown in the drawing.

EXAMPLE 2

Figure 5:
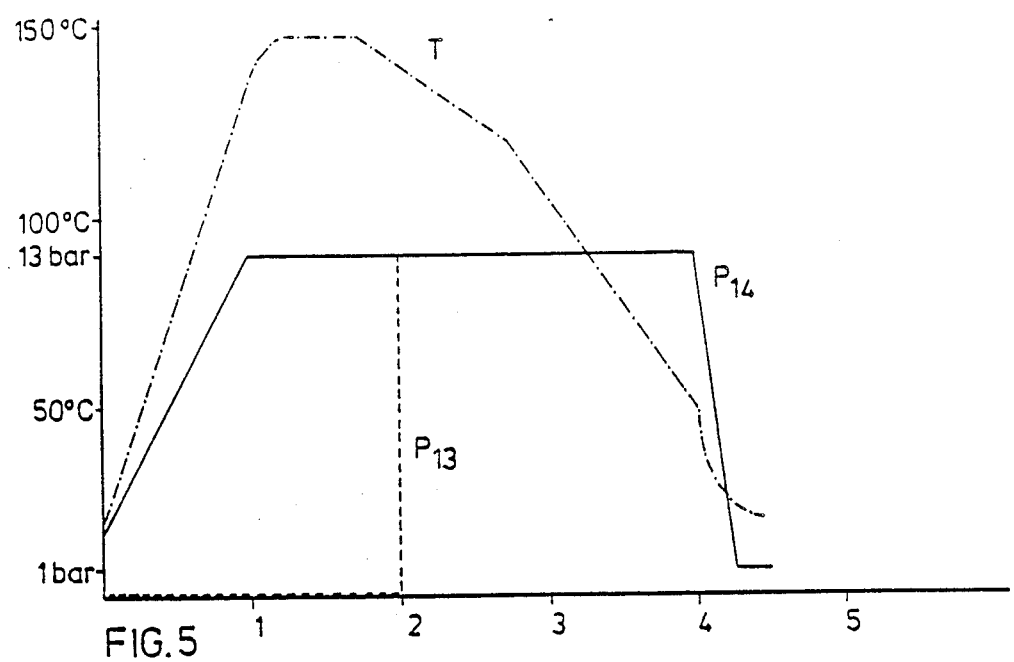
FIG. 5 is a temperature and pressure schedule which is employed in a specific example of a process for surface conditioning a sheet of thermoplastics material.

Extruded polycarbonate sheet of nominal 6 mm thickness is assembled between 6 mm thick sheets of float glass serving as moulding plates. The glass is previously coated on both faces with an adhesion inhibitor. The sandwich assembly is placed within the apparatus illustrated in FIG. 3 and is then subjected to the temperature and pressure schedules indicated in FIG. 5.

The pressure $P_{14}$ (solid line FIG. 5) within the autoclave space 14 which bears on the main faces of the assembly is increased over a period of about one hour from about 1 bar to about 13 bar, and it is maintained at that pressure for a further 3 hours.

It is important that the pressure $P_{14}$ on the main faces of the assembly should be exerted by a fluid medium, such as a gas, rather than by calendering or the use of some other form of mechanical press, because it ensures a uniform pressure across those faces, and this in turn leads to a more uniform treatment of the thermoplastics sheet material.

The pressure $P_{13}$ (dashed line in FIG. 5) within the conduit 13 is reduced to about 10 torr so as to avoid the entrapment of any air between the polycarbonate and the moulding plates, and is kept at that low pressure for about 2 hours whereafter it is increased to about 13 bar, for example by opening communication between the conduits 13 and 15.

The temperature T (dot-dash line in FIG. 5) of the polycarbonate sheet material is increased to between 140° C. and 150° C. over the course of 75 minutes, and it is maintained at that temperature for a further 30 minutes. The polycarbonate material is then allowed to cool at a rate of about 0.5° C./min for a first cooling period lasting about 60 minutes, whereafter the cooling rate is increased to about 1° C./min during a second cooling period which lasts for about 75 minutes. At the end of that second cooling period, when a total of about 4 hours has elapsed, the temperature of the polycarbonate is about 50° C., and at that stage, pressure within the autoclave is allowed to return to atmospheric, and the assembly therein is allowed to cool naturally. The autoclave may then be opened after about another 15 minutes, and the polycarbonate and moulding plates may be removed.

At the end of the process it was found that the polycarbonate sheet material was reduced in thickness to about 5 mm, and that its surfaces were substantially flat allowing clear vision through it.

The resulting polycarbonate sheet was well able to satisfy the optical distortion test set forth in "Moniteur Belge" of 4th February 1981 at pages 1165 to 1170.

In a variant of this Example, a sheet face of the polycarbonate material was precoated with a melamine resin. The coated polycarbonate sheet material was then subjected to a substantially identical surface conditioning treatment schedule, whereafter it was found that the surface coating had been cured in situ. The resulting surface coating is harder and more scratch resistant than the uncoated polycarbonate. The same surface regularity was achieved.

The resulting surface conditioned polycarbonate sheet material is then bent to a predetermined curvature by a process as set forth in Example 1.

The product of the process of this Example is suitable for incorporating into a laminated glazing panel, for example as an external ply thereof.

FIG. 4

Figure 4:
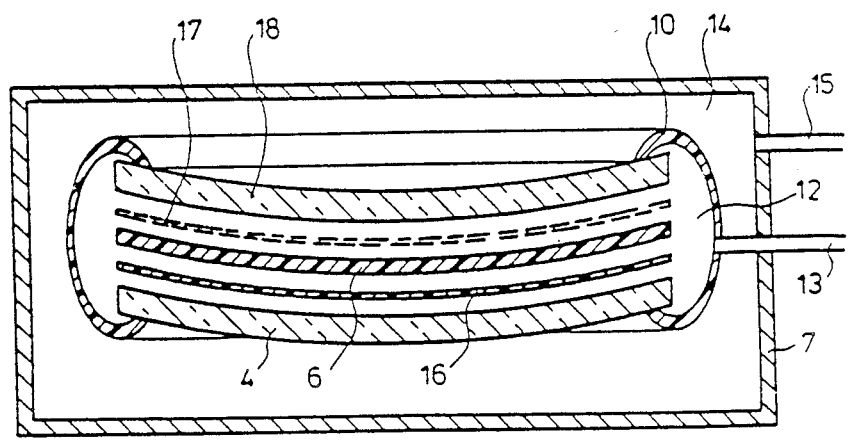
FIG. 4 is a schematic cross sectional view of an apparatus for bonding together a curved laminated panel.

Apparatus suitable for bonding a laminate together by a process in accordance with this invention is illustrated in FIG. 4. In fact this apparatus is very similar to that illustrated in FIG. 3, and the various parts of the apparatus are allotted the same reference numerals in FIG. 4 as they are in FIG. 3.

A sandwich assembly is made up of a curved sheet of glass 4 and a conforming sheet of thermoplastics material 6 interleaved with adhesive thermoplastics film material 16. In dotted lines is shown a second layer of adhesive film material 17 between the thermoplastics sheet 6 and a second curved glass sheet 18 for the optional bonding of that second glass sheet into the laminate to be formed. If the sheet of thermoplastics material 6 is to be exposed in the finished laminate, then that second layer of adhesive film material 17 is omitted. The whole assembly is fitted with a torus 4 and placed in the autoclave as described with reference to FIG. 1. The first glass sheet 4 may be coated with an adhesion promoting agent, and the second glass sheet 18 may be coated with an adhesion promoting agent or an adhesion inhibiting agent according to whether it is to be bonded into the laminate, as desired. In a variant, the second glass sheet 18 is omitted.

It will be appreciated that any required number of thermoplastics and glass sheets interleaved with adhesive film material could be bonded into a laminate by a process in accordance with this aspect of the invention. Merely by way of example, the assembly for bonding into a laminate might comprise a sub-assembly consisting of four sheets of glass interleaved only by adhesive film material, there being provided a further adhesive film for bonding a single thermoplastics sheet onto one face of that sub-assembly.

EXAMPLE 3

In order to produce a curved vehicle windscreen, a sub-assembly was made up of a sheet of glass and a sheet of polycarbonate interleaved with polyurethane as adhesive film material. The glass sheet was each 6 mm thick, and it was precoated with an optional adhesion promoting primer. The polyurethane was used in a layer 2 mm thick. The polycarbonate sheet used was the melamine coated product of Examples 2 and 1 as described above, the melamine coating of course facing away from the glass.

A glass moulding plate 18 coated with adhesion inhibitor was then assembled against the polycarbonate sheet, and the whole was enclosed in the slit torus and placed in the autoclave, where it was subjected to the temperature and pressure schedules for effecting bonding of a laminate.

In a first period of the bonding treatment, the pressure acting on the main faces of the assembly was maintained at about atmospheric, while the intersheet spaces were subjected to low pressure by reducing the pressure in the conduit 7 to effect degassing of the sandwich assembly. The temperature in the autoclave was increased. Then, in a second period, the interior 6 of the torus 4 was placed in communication with the remainder of the interior 8 of the autoclave, and the pressure therein was increased while the assembly was heated in order to effect final bonding.

At the end of the process it was found that the laminate was firmly bonded together, and that its surfaces were substantially regular allowing clear vision through it. The resulting laminated panel was well able to satisfy the optical distortion test set forth in "Moniteur Belge" of 4th February 1981 at pages 1165 to 1170.

EXAMPLE 4

In a variants of Example 3, the sub-assembly 4, 16, 6 is simultaneously bonded to the second film of adhesive material 17 (again polyurethane 2 mm thick, and to the second sheet of glass 18 which in this Example is coated with an adhesion promoting primer.

I claim:

1. A process of imparting a predetermined curvature to a sheet of thermoplastics material in which a said thermoplastic sheet is bent by placing it against a face of a bending form having a moulding surface area of the required curvature, heating said thermoplastics sheet and causing or allowing it to conform to said moulding surface area, wherein said thermoplastics sheet is formed oversized and is bent by placing it against a bending form having a moulding surface area portion of the required dimensions and curvature which is surrounded by a bending form surround, said thermoplastics sheet being heated and caused or allowed to conform to said moulding surface area portion while its oversized margins are supported by said bending form surround, and said thermoplastics sheet is thereafter cooled at a rate slow enough to maintain such conformity, and wherein said thermoplastics sheet is thereafter trimmed to size and, while it remains in contact with said bending form moulding surface, the thermoplastics material is caused or allowed to cool from its maximum temperature for a first period at a first cooling rate and thereafter for a second period at a second cooling rate which is higher than said first cooling rate.

2. A process according to claim 1, wherein the surfaces of a said thermoplastics sheet are conditioned by a process comprising sandwiching the thermoplastics sheet between a pair of glass moulding plates and subjecting the sandwich to temperature and pressure conditions such as to soften the thermoplastics material and bring about the required surface conditioning, in which process, prior to removal of said moulding plates, the thermoplastics material is caused or allowed to cool from its maximum temperature for a first period at a first cooling rate and thereafter for a second period at a second cooling rate which is higher than said first cooling rate.

3. A process according to claim 2, wherein a plurality of said thermoplastics sheets is interleaved with glass moulding plates to form a multilayer sandwich whereby said plurality of thermoplastics sheets is conditioned simultaneously.

4. A process according to claim 2, wherein such surface conditioning treatment is performed before the thermoplastics material is curved.

5. A process according to claim 1, wherein during the or at least one, and preferably each said first cooling period, the thermoplastics material is caused or allowed to cool at a rate which does not exceed 2° C. per minute, and which preferably does not exceed 1° C. per minute.

6. A process according to claim 1, wherein during the or at least one, and preferably each said second cooling period, the thermoplastics material is caused or allowed to cool at a rate which does not exceed 5° C. per minute, and which preferably does not exceed 2.5° C. per minute.

7. A process according to claim 1, wherein the or at least one, and preferably each said first cooling period lasts until the temperature of the thermoplastics material has dropped by between 20° C. and 60° C.

8. A process according to claim 1, wherein the or at least one, and preferably each said first cooling period lasts between 40 and 90 minutes.

9. A process according to claim 1, wherein the or at least one, and preferably each consecutive first and second cooling periods together last between 90 and 150 minutes.

10. A process according to claim 1, wherein the or at least one, and preferably each said second cooling period lasts at least until the temperature of the thermoplastics material has dropped to 100° C.

11. A process according to claim 16, wherein the or at least one, and preferably each said second cooling period lasts at least until the temperature of the thermoplastics material has dropped to 80° C.

12. A process according to claim 1, wherein a sheet of float glass defines the moulding surface of the or each said glass moulding plate.

13. A process according to claim 1, wherein the or at least one said thermoplastics sheet is a sheet of polycarbonate.

14. A process according to claim 1, wherein the or at least one said thermoplastics sheet bears at least one surface coating which is, or is curable to become, harder than the thermoplastics material of that sheet.

15. A process according to claim 2, wherein the or at least one said thermoplastics sheet bears at least one surface coating which is, or is curable to become, harder than the thermoplastics material of that sheet, and curing of said surface coating(s) is effected during said surface conditioning.

16. A process according to claim 14, wherein said surface coating is a melamine coating.

17. A process according to claim 1, wherein said bending form and said bending form surround are constituted by separable elements.

18. A process according to claim 17, wherein said bending form moulding surface area of the required size and curvature is constituted by a face of a curved sheet of glass.

19. A process according to claim 2, wherein said bending form and said bending form surround are constituted by separable elements and wherein said bending form moulding surface area of the required size and curvature is constituted by a face of a curved sheet of glass and wherein said bending form moulding surface area of the required size and curvature is constituted by a face of a curved sheet of glass to which the thermoplastics sheet is subsequently bonded.

20. A process according to claim 1, wherein said thermoplastics sheet is caused or allowed to conform to a concave bending form moulding surface.

21. A process according to claim 1, wherein the transition from said bending form moulding surface area of the required size and curvature to such bending form surround is of sharper curvature than the margin of said bending form moulding surface area.

* * * * *